(12) United States Patent
Laval et al.

(10) Patent No.: US 8,978,811 B2
(45) Date of Patent: Mar. 17, 2015

(54) ANTITHEFT DEVICE FOR THE STEERING MECHANISM OF A MOTOR VEHICLE

(75) Inventors: Anthony Laval, Erdweg (DE); Lukas Kaliebe, Erdweg (DE)

(73) Assignee: Valeo Sicherheitssysteme GmbH, Erdweg (DE)

( * ) Notice: Subject to any disclaimer, the term of this patent is extended or adjusted under 35 U.S.C. 154(b) by 0 days.

(21) Appl. No.: 13/980,059

(22) PCT Filed: Jan. 4, 2012

(86) PCT No.: PCT/EP2012/050113
§ 371 (c)(1),
(2), (4) Date: Nov. 22, 2013

(87) PCT Pub. No.: WO2012/098016
PCT Pub. Date: Jul. 26, 2012

(65) Prior Publication Data
US 2014/0124282 A1 May 8, 2014

(30) Foreign Application Priority Data

Jan. 21, 2011 (EP) .................................... 11151740

(51) Int. Cl.
*B60R 25/0215* (2013.01)
*B60R 25/00* (2013.01)

(52) U.S. Cl.
CPC ......... *B60R 25/003* (2013.01); *B60R 25/02153* (2013.01)
USPC ................................ 180/287; 70/186; 70/252

(58) Field of Classification Search
CPC .................... B60R 25/0211; B60R 25/02134; B60R 25/02147; B60R 25/0215; B60R 25/02153; B60R 25/02156; B62D 3/02; B62D 3/04; B62D 5/0403; B62D 5/0406; B62D 5/0409; B62D 5/0412; B62D 5/0421; B62D 5/0424; B62D 5/0454
USPC ............... 70/186, 252; 74/496–500; 180/287, 180/443, 444; 280/93.513
See application file for complete search history.

(56) References Cited

U.S. PATENT DOCUMENTS

| 4,576,024 A | * | 3/1986 | Weber .............................. 70/252 |
| 4,685,313 A | * | 8/1987 | Neyret ............................. 70/186 |
| 4,773,241 A | * | 9/1988 | Peitsmeier et al. ............. 70/252 |
| 4,784,415 A | * | 11/1988 | Malaval ........................ 292/144 |
| 4,907,427 A | * | 3/1990 | Armstrong ...................... 70/252 |

(Continued)

FOREIGN PATENT DOCUMENTS

| DE | 100 61 960 A1 | 7/2002 |
| EP | 628455 A1 * | 12/1994 |

(Continued)

OTHER PUBLICATIONS

International Search Report issued in PCT/EP2012/050113 mailed Feb. 24, 2012 (6 pages).

*Primary Examiner* — Ruth Ilan
*Assistant Examiner* — Laura Freedman
(74) *Attorney, Agent, or Firm* — Osha Liang LLP

(57) ABSTRACT

An antitheft device for the steering column of a motor vehicle, in which a movable indexer includes a return spring for returning the movable indexer such that the indexer engages with at least one profile of a cam of the antitheft device, and in which the return spring of the indexer and a return spring of a bolt of the antitheft device are separate.

9 Claims, 2 Drawing Sheets

(56) References Cited

U.S. PATENT DOCUMENTS

| | | | | |
|---|---|---|---|---|
| 5,271,252 A * | 12/1993 | Yasuhara et al. | | 70/186 |
| 5,454,238 A * | 10/1995 | Ross et al. | | 70/186 |
| 5,495,732 A * | 3/1996 | Nagae et al. | | 70/252 |
| 5,813,699 A * | 9/1998 | Donner et al. | | 280/775 |
| 6,035,675 A * | 3/2000 | Zimmer et al. | | 70/186 |
| 6,125,671 A * | 10/2000 | Suzuki | | 70/186 |
| 6,298,938 B1 * | 10/2001 | Klaiber et al. | | 180/287 |
| 6,327,882 B1 * | 12/2001 | Canard | | 70/186 |
| 6,349,579 B1 * | 2/2002 | Canard | | 70/186 |
| 6,354,117 B1 * | 3/2002 | Canard | | 70/186 |
| 6,354,118 B1 * | 3/2002 | Frick et al. | | 70/186 |
| 6,400,041 B1 * | 6/2002 | Engelmann et al. | | 307/10.2 |
| 6,439,011 B1 * | 8/2002 | Frick et al. | | 70/186 |
| 6,508,088 B1 * | 1/2003 | Barbier et al. | | 70/186 |
| 6,675,673 B2 * | 1/2004 | Starken | | 74/527 |
| 6,755,058 B2 * | 6/2004 | Zillmann | | 70/252 |
| 6,794,768 B2 * | 9/2004 | Uselli | | 307/10.5 |
| 6,915,671 B2 * | 7/2005 | Zillmann | | 70/186 |
| 6,941,781 B2 * | 9/2005 | Fukushima | | 70/252 |
| 6,952,059 B1 * | 10/2005 | Louvel et al. | | 307/9.1 |
| 7,021,093 B2 * | 4/2006 | Fukatsu et al. | | 70/186 |
| 7,049,931 B2 * | 5/2006 | Hayashi et al. | | 340/5.61 |
| 7,055,351 B2 * | 6/2006 | Suzuki et al. | | 70/186 |
| 7,086,256 B2 * | 8/2006 | Hasegawa | | 70/186 |
| 7,104,097 B2 * | 9/2006 | Zillmann | | 70/186 |
| 7,111,480 B2 * | 9/2006 | Dimig et al. | | 70/186 |
| 7,127,921 B2 * | 10/2006 | Kinme et al. | | 70/252 |
| 7,140,213 B2 | 11/2006 | Feucht et al. | | |
| 7,260,963 B2 * | 8/2007 | Suzuki et al. | | 70/186 |
| 7,363,785 B2 * | 4/2008 | Limburg et al. | | 70/186 |
| 7,673,483 B2 * | 3/2010 | Flandrinck | | 70/252 |
| 7,810,363 B2 * | 10/2010 | Okada et al. | | 70/186 |
| 7,823,426 B2 * | 11/2010 | Okuno et al. | | 70/186 |
| 7,856,858 B2 * | 12/2010 | Laval et al. | | 70/186 |
| 7,921,684 B2 * | 4/2011 | Okuno et al. | | 70/186 |
| 8,001,814 B2 * | 8/2011 | Okada et al. | | 70/186 |
| 8,229,628 B2 * | 7/2012 | Sakakura et al. | | 701/41 |
| 8,424,348 B2 * | 4/2013 | Dimig et al. | | 70/186 |
| 8,505,346 B2 * | 8/2013 | Sugimoto | | 70/252 |
| 8,689,593 B2 * | 4/2014 | Giacomin | | 70/187 |
| 2006/0005588 A1 * | 1/2006 | Okuno | | 70/186 |
| 2006/0169011 A1 * | 8/2006 | Limburg | | 70/186 |
| 2006/0213238 A1 * | 9/2006 | Thronberens et al. | | 70/186 |
| 2010/0011820 A1 * | 1/2010 | Giacomin | | 70/252 |
| 2013/0047685 A1 * | 2/2013 | Villagrasa et al. | | 70/253 |
| 2014/0069155 A1 * | 3/2014 | Laval et al. | | 70/183 |

FOREIGN PATENT DOCUMENTS

| | | | |
|---|---|---|---|
| EP | 669234 A1 * | 8/1995 | |
| EP | 706919 A1 * | 4/1996 | |
| EP | 764565 A1 * | 3/1997 | |
| EP | 764566 A1 * | 3/1997 | |
| EP | 1 558 475 B1 | 2/2006 | |
| EP | 1 698 530 A2 | 9/2006 | |
| FR | 2748710 A1 * | 11/1997 | |
| FR | 2 793 749 A1 | 11/2000 | |
| FR | 2820385 A1 * | 8/2002 | |
| FR | 2 836 435 A1 | 8/2003 | |

\* cited by examiner

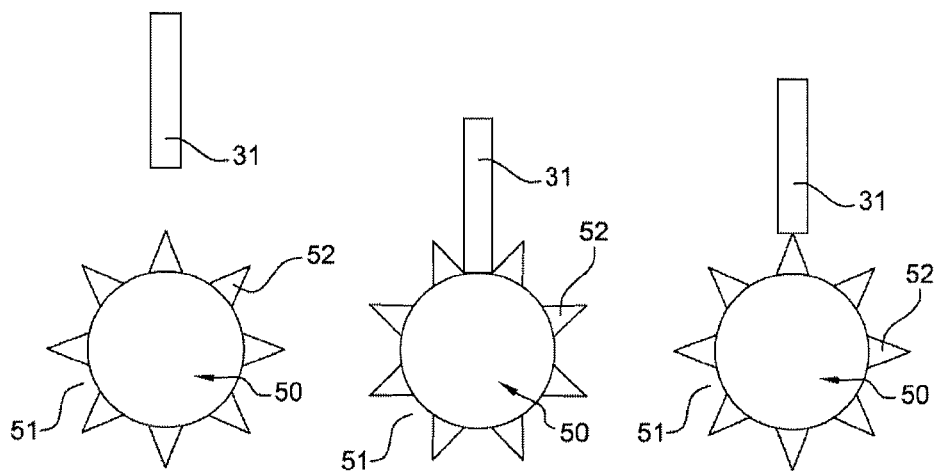
Fig. 2a   Fig. 2b   Fig. 2c
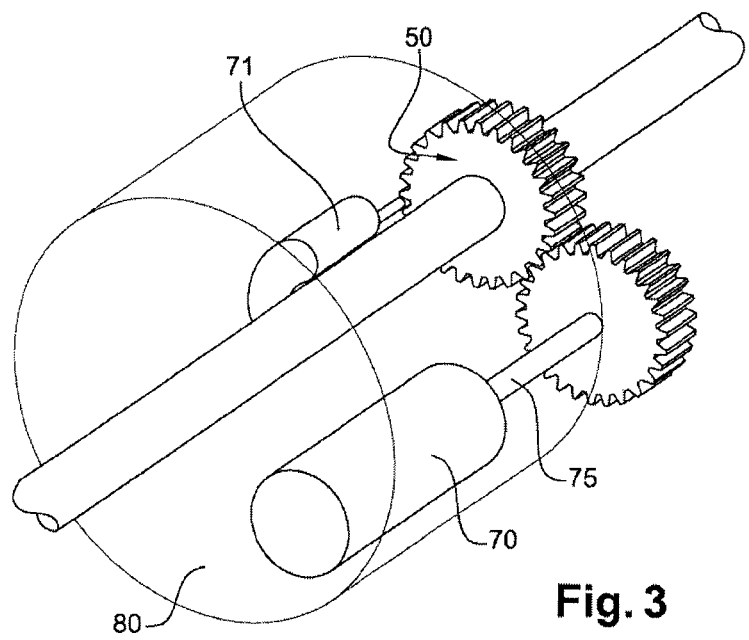
Fig. 3

ANTITHEFT DEVICE FOR THE STEERING MECHANISM OF A MOTOR VEHICLE

CROSS-REFERENCE TO RELATED APPLICATIONS

This is a national stage application based on PCT/EP2012/050113, filed on Jan. 4, 2012. This application claims the priority from the same, and hereby incorporates the same by reference in its entirety.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION

The invention relates to steering-column locks of the electrically motorized type.

Many constructions of steering-column locks are known. First, steering-column locks have been proposed comprising a motor and a gearwheel which drives a locking bolt via a cam or a gradient associated with the gearwheel, wherein the gearwheel rotates about a shaft which is parallel to an output shaft of the electric motor, or else in which the gearwheel rotates about a shaft which is perpendicular to the output shaft of the electric motor.

The bolt then travels slidingly closer to the steering column, under the action of a profile arranged on the gearwheel, to a locked position of the steering column.

Conventionally, the bolt is designed to immobilize the shaft of the steering column by fitting into a longitudinal groove arranged on the contour of this shaft. For this purpose, the shaft comprises several grooves distributed angularly on its contour. The portions of the contour of the shaft separating two successive grooves are called teeth. When the bolt is in protruding position of interaction with the contour of the column shaft, it is either fitted into a groove for immobilizing this shaft, or in contact with a tooth. In the latter case, the column shaft is not prevented from rotating. However, as this is conventional, if the steering wheel connected to the shaft is operated, this shaft is automatically immobilized after a brief angular travel of the latter having the effect of placing a groove in line with the bolt so as to allow the latter to fit into this groove.

In the case of a motorized steering lock, it is essential to define positions called unlocking and locking positions in order to switch off the motor when they are reached. Accordingly, an indexing device and indexer associated with the bolt are provided, that is to say that the motor will be switched off only when the bolt has reached the unlocked position or the locked position. With respect to the position called the locked position, because the bolt may be either on a tooth or in a groove, two options can be used. The first option consists in defining the locked position for a bolt that is in a groove, this position corresponds to the lowest position of the bolt. If, in this indexation configuration of the locked position, the bolt is not in a groove but on a tooth, the bolt has not been able to reach its bottom position and therefore the locked position has not been able to be detected. The motor therefore continues to run. In order to prevent this phenomenon, it is therefore preferred to define the position called the locked position for a bolt that is on a tooth. In this indexation configuration of the locked position, the motor is stopped for a bolt position that has not reached the bottom level, that is to say in a groove. In order to compensate for this difference, provision is made to keep the motor running for a certain period of time. Unfortunately, with this additional rotation, the gearwheel risks reaching its position of abutment and causing a repetition of mechanical force on this abutment.

BRIEF SUMMARY OF THE INVENTION

The object of the invention is to alleviate these drawbacks while maintaining a compact configuration of a steering lock that can be housed in a restricted space at the bottom of the steering column.

This object is achieved according to the invention by virtue of a motorized steering-column lock for a motor vehicle capable of adopting a locked configuration and an unlocked configuration of the steering column of the vehicle, said steering lock comprising:

an electric motor driving a gearwheel,
at least one profile placed on at least one face of the gearwheel,
a bolt that can move between a locked position and an unlocked position of the steering column, said bolt comprising:
  a main bar of which one end interacts with an element of the steering column in the locked position,
  the bolt interacting with said profile such that the profile drives the bolt between the locked position and the unlocked position of the column,
  a return spring for returning the bolt to the locked position,
a movable indexer interacting with at least one sensor in order to detect a position of the profile controlling a locked configuration of the column of the steering lock, characterized in that it comprises a return spring to return the movable indexer in interaction with said at least one profile and in that the return spring of the indexer and the return spring of the bolt are distinct.

A steering lock according to the invention may also have one or more of the features below considered individually or in all the technically possible combinations:

The indexer comprises a magnet and said at least one sensor is a Hall effect sensor.
The sensor is a mechanical commutator and in that the indexer is furnished with a surface element capable of interacting with said at least one mechanical commutator.
The indexer is translatably mounted in a channel arranged on the bolt.
The return spring of the bolt is mounted between the bolt and a fixed element of the steering lock such that the compression of the spring does not depend on a relative position of the bolt and of the movable indexer.

The output shaft of the motor, the direction of movement of the bolt and the direction of movement of the movable indexer are parallel.

The bolt and the movable indexer rest on the profile of the gearwheel from the same side of said profile and move in the same direction against the profile.

The invention also relates to a module for assisting the rotation of a steering column, comprising an assistance motor applying a pivoting force to the steering column, characterized in that it comprises a steering lock according to any one according to the preceding features.

The invention also relates to an assembly consisting of a steering column of a motor vehicle and a steering lock according to any one of the preceding features.

Finally, the invention relates to a combined assembly of a steering column of a motor vehicle and a module for assisting the rotation of the steering column according to the preceding features, wherein the steering column comprises a peripheral ring gear in which the bolt is engaged in the locked position and which peripheral ring gear receives a steering-column pivoting force delivered by the assistance motor.

BRIEF DESCRIPTION OF THE SEVERAL VIEWS OF THE DRAWINGS

Other features, objects and advantages of the invention will become apparent on reading the following detailed description made with reference to the appended figures in which:

FIG. 2a is a view of the column in the unlocked position,

FIG. 2b is a view of the steering column in a locked position,

FIG. 2c is a view of the column in the RTL (ready to lock) position,

FIG. 3 is a view representing a combined assembly consisting of a steering column and a module for assisting the rotation of the steering column according to a preferred embodiment of the invention.

DETAILED DESCRIPTION OF THE INVENTION

Figure 1A:
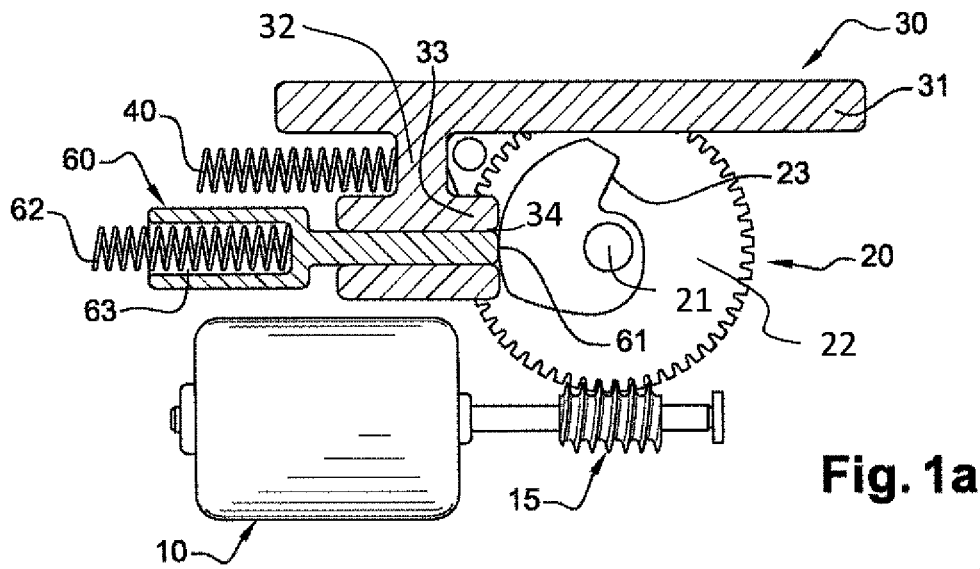
FIG. 1a is a view of a steering lock according to a preferred embodiment of the invention in an unlocked configuration of the steering column of the vehicle.
Figure 1B:
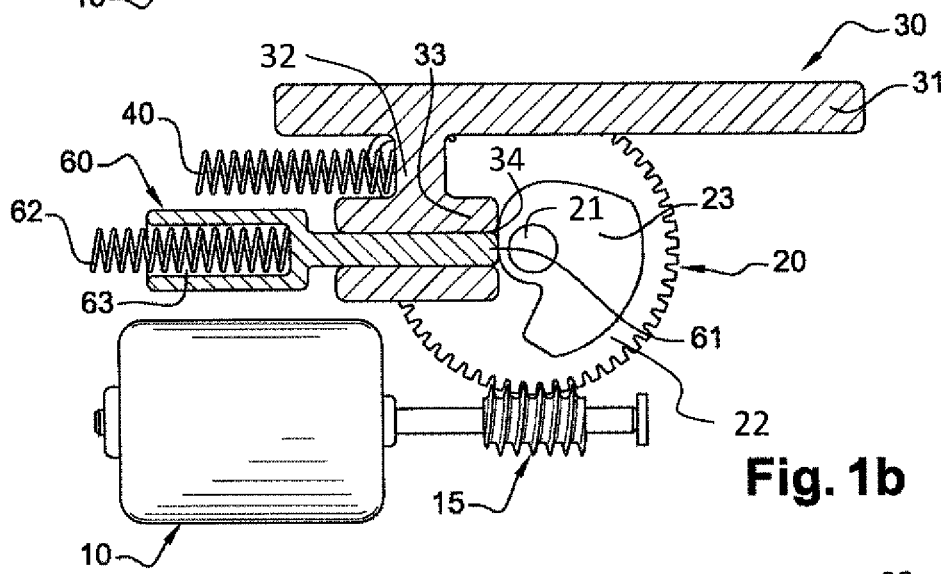
FIG. 1b is a view of a steering lock according to a preferred embodiment of the invention in a locked configuration of the steering column of the vehicle.

The steering lock shown in FIG. 1a comprises an electric motor 10 furnished with an output shaft forming a worm 15, a gearwheel 20 engaged on the worm 15, and a bolt 30 mounted slidingly, these various elements being placed in a housing not shown.

The gearwheel 20 is mounted so as to rotate about a shaft 21 which extends perpendicularly to the output shaft of the motor 10 such that the output shaft of the motor is indistinguishable in the geometric plane of the wheel.

The wheel 20 has a first face 22, turned toward a steering column not shown, which is furnished with a cam 23 in a disk portion which interacts with the bolt. Accordingly, the bolt 30 has, in addition to a main bar 31, a lateral appendage 32 capable of being interposed, at its first end 33, onto the path of the cam 23 when the latter pivots with the gearwheel 20. The lateral appendage 32 is pushed against the cam 23 under the effect of the return spring 40 which returns the bolt 30 to the locked position. This interaction of the lateral appendage 32 of the bolt 30 with the cam 23 therefore has the effect of bringing the main bar 31 closer to an outer ring gear 50 of the steering column.

In an alternative embodiment not shown, the cam 23 is replaced by a gradient.

The steering lock also comprises a control unit advantageously implemented in the form of an electronic circuit placed in the housing. In addition to implementing the control of the electric motor 10, the control unit also takes account of the information supplied by an indexation device.

This indexation device makes it possible to inform the motorized control unit that the gearwheel has reached a position allowing the main bar 31 of the bolt to carry out the locking and the unlocking. In response to this information, the control unit commands the stopping of the motor.

This indexation device essentially comprises a movable indexer 60 interacting with two sensors not shown of which one is used for detecting the position called the unlocked position and the other for the detection of the position called the locked position.

The position called the unlocked position is illustrated in FIG. 3a and corresponds to a position in which the main bar 31 of the bolt 30 is at a distance from the outer ring gear of the steering column. As can be seen also in FIGS. 3b and 3c, the ring gear 50 of the column consists of grooves 51 surrounded on either side by teeth 52. The locking of the column takes place when the main bar 31 of the bolt 30 is at the bottom of a groove 51, resting against an interstice of the ring gear 50, thus preventing the ring gear 50 and hence the column from rotating. In certain conditions, although the gearwheel has reached the position called the locked position, the main bar 31 of the bolt 30 may be resting on a tooth 52 of the ring gear 50. This position is called the RTL (ready to lock) position. Specifically, in this position, the column can be rotated. However, as is conventional, if the steering wheel connected to the column is operated, a brief angular travel of the latter will have the effect of placing a groove 51 in line with the main bar 31 of the bolt 30 so as to allow the latter to fit into this groove 51. This fitting will take place with the aid of the return spring 40 of the bolt.

The movable indexer 60 advantageously consists of a bar extending longitudinally parallel to the sliding axis of the bolt 30, a first end 61 of the movable indexer 60 pressing on the cam 23 of the gearwheel 20. The movable indexer 60 is held, at its first end 61, pressing on the cam 23 by a return spring 62, advantageously placed on the second end of the movable indexer 60. It is also on this second end that a magnet 63 is placed. In this case, the two indexation sensors are of the Hall effect or Reed switch type. In an alternative embodiment, a boss is placed on the second end of the indexer 60, and the two magnetic sensors are replaced by mechanical commutators. Thus configured, the movable index 60 will, under the rotary action of the gearwheel 20, follow the contour of the cam 23 and move in a direction parallel to the sliding direction of the bolt 30.

In one advantageous embodiment, notably for requirements of compactness, the movable indexer 60 is placed so as to slide freely in a groove 34 arranged on the lateral appendage 32 of the bolt 30.

Figure 1C:
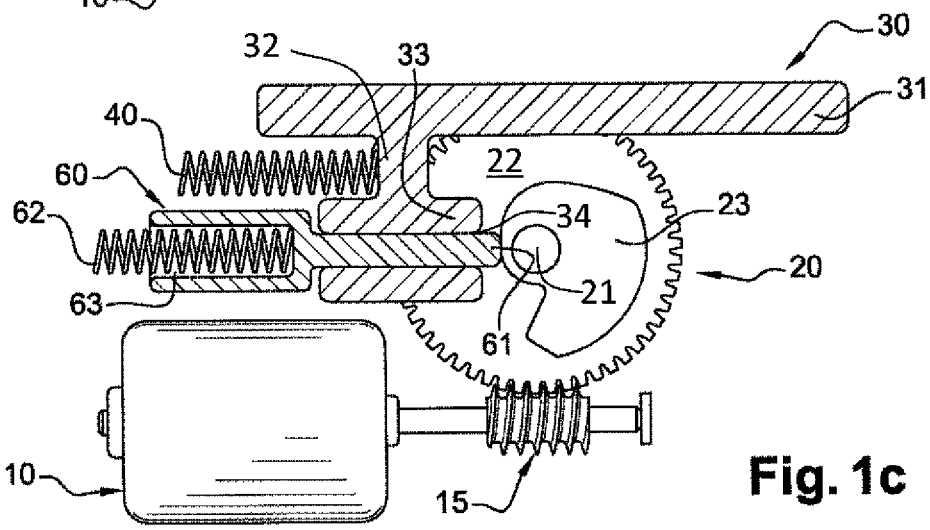
FIG. 1c is a view of a steering lock according to a preferred embodiment of the invention in an intermediate configuration of locking of the steering column of the vehicle.

Starting from an unlocked position illustrated in FIGS. 1a and 2a, and to reach a locked position illustrated in FIGS. 1b and 2b or FIGS. 1c and 2c, the gearwheel 20 will turn in the clockwise direction. The end 33 of the lateral appendage 32 of the bolt 30 and the end 61 of the movable indexer will both initially follow the contour of the cam 23 and respectively drive the bolt 30 and the movable indexer 60 to slide parallel in the same direction. As illustrated in FIGS. 1c and 2c, because the movable indexer 60 slides freely in the groove 34 arranged on the lateral appendage 32 of the bolt 30, the movable indexer 60 can reach the locked position while the bar 31 is in the RTL (ready to lock) position, the motor will then receive a stop instruction via one of the sensors of the indexation device.

In one advantageous embodiment, the steering-column lock is an element of forming a module for motorized assistance to the rotation of the steering column. Incorporating the steering lock in a module for motorized assistance to the pivoting of the steering column provides an advantage in terms of safety since the steering lock is then in a particularly low portion of the steering column, at a particularly great distance from the instrument panel where a thief by predilection takes action and in a particularly inaccessible portion of the vehicle.

As illustrated in FIG. 3, in this case the motorized assistance module comprises an assistance motor 70 which is oriented such that its output shaft 75 extends parallel to the steering column. The output shaft 75 of the motor 70 has peripheral gear teeth which mesh with a ring gear 50 surrounding the steering column in order to rotate the latter. The ring gear 50 is advantageously the ring gear in which the bolt engages such that only one ring gear is used for both functions of driving and immobilizing, further reducing the space requirement necessary for the implementation of the assistance module described.

Advantageously, the steering lock and the assistance motor are placed radially opposite with respect to the steering column, such that the bolt and the output shaft 75 of the assistance motor do not interfere. The motorized assistance module advantageously comprises one and the same electronic control unit for the assistance of pivoting and for controlling the immobilization of the column, which ensures that no assistance control is applied to the assistance motor when the steering lock is in the locked position.

Due to the fact that the steering-column lock, in this instance referenced 71, is a portion of the module for motorized assistance to the rotation of the steering column, the control unit that is common to the motorized assistance and the locking of the steering column is advantageously fitted with a control logic applying a slight rotational movement of the steering column when it simultaneously controls a driving force to unlock the bolt. Thus, by this slight movement, any frictional retention is removed between the bolt and the steering column, for example between the bolt and a lateral edge of a tooth of the ring gear 50 and the bolt slides reliably each time the vehicle is switched on.

The control unit is advantageously implemented in the form of an electronic circuit placed in a common housing 80 of the assistance motor 70 and of the steering lock 71. The electronic circuit is advantageously positioned outside the housing specific to the steering lock. In addition to implementing the control of the steering lock via this control unit notably in this instance takes account of the position of the bolt which is indicated to it by the receipt of output signals from the indexer positioning sensors as described above.

Naturally, many modifications can be made to the invention without departing from the context of the latter.

The invention claimed is:

1. A motorized steering-column lock for a motor vehicle capable of adopting a locked configuration and an unlocked configuration of a steering column of the vehicle, said steering column lock comprising:
   an electric motor driving a gearwheel;
   at least one profile placed on at least one face of the gearwheel;
   a bolt configured to move between a locked position and an unlocked position of the steering column, said bolt comprising:
      a main bar of which one end interacts with an element of the steering column in the locked position, the bolt interacting with said profile such that the profile drives the bolt between the locked position and the unlocked position of the steering column, and
      a return spring for returning the bolt to the locked position;
   a movable indexer interacting with at least one sensor in order to detect a position of the profile controlling the locked configuration of the steering column of the steering column lock; and
   a return spring to return the movable indexer in interaction with said at least one profile, wherein the return spring of the indexer and the return spring of the bolt are distinct,
   wherein an output shaft of the motor, a direction of movement of the bolt and a direction of movement of the movable indexer are parallel.

2. The steering-column lock as claimed in claim 1, where the indexer comprises a magnet, and wherein said at least one sensor is a Hall effect sensor.

3. The steering-column lock as claimed in claim 1, wherein said at least one sensor is a mechanical commutator and wherein the indexer is furnished with a surface element capable of interacting with said at least one mechanical commutator.

4. The steering-column lock as claimed in claim 1, wherein the indexer is translatably mounted in a channel arranged on the bolt.

5. The steering-column lock as claimed in claim 1, wherein the return spring of the bolt is mounted between the bolt and a fixed element of the steering column lock such that a compression of the return spring of the bolt does not depend on a relative position of the bolt and of the movable indexer.

6. The steering-column lock as claimed in claim 1, wherein the bolt and the movable indexer rest on the profile of the gearwheel from the same side of said profile and move in the same direction against the profile.

7. A module for assisting a rotation of a steering column, comprising an assistance motor applying a pivoting force to the steering column, wherein the module comprises a steering column lock as claimed in claim 1.

8. An assembly comprising a steering column of a motor vehicle and a steering column lock as claimed in claim 1.

9. A combined assembly of a steering column of a motor vehicle and a module for assisting a rotation of the steering column as claimed in claim 7, wherein the steering column comprises a peripheral ring gear in which the bolt is engaged in the locked position and which peripheral ring gear receives a steering-column pivoting force delivered by the assistance motor.

* * * * *